Aug. 16, 1927.

R. L. MUNDAY 1,639,051

HEAT EXCHANGE APPARATUS

Filed Dec. 21, 1926    2 Sheets-Sheet 2

Inventor:
Reginald Luther Munday

Patented Aug. 16, 1927.

1,639,051

UNITED STATES PATENT OFFICE.

REGINALD LUTHER MUNDAY, OF BATH, ENGLAND.

HEAT-EXCHANGE APPARATUS.

Application filed December 21, 1926, Serial No. 156,197, and in Great Britain December 5, 1925.

This invention refers to heat exchangers for liquids or fluids, and more particularly relates to a method of and apparatus for transferring heat from one liquid or fluid to another, to thereby effect an exchange of temperatures between such liquids or fluids, said method and apparatus being of the type in which the one liquid or fluid is passed through a shallow spiral conduit disposed in continuous heat-conducting contact with co-axial inner and outer chambers or conduits for the other liquid or fluid.

The invention, although particularly intended and adapted for use in connection with the pasteurization or sterilization of milk or cream, is of general application in connection either with the heating or the cooling of liquids or fluids of various kinds.

The present invention provides firstly a method of heat exchanging for liquids or fluids, which method consists in passing the liquid or fluid to be treated in tenuous form through a shallow spiral conduit disposed around a cylindrical shell so as to be in continuous heat-conducting contact with co-axial inner and outer spiral conduits through each of which the heating or cooling liquid or fluid is passed in a direction contra-current to the flow of liquid or fluid to be treated.

The invention provides secondly a heat-exchanging apparatus for liquids or fluids, which apparatus comprises, in combination, a cylindrical sleeve, a cylindrical shell fitted closely and coaxially therein, a groove or grooves disposed around said shell so as to constitute a shallow spiral conduit between the sleeve and the shell, an outer heat-insulating jacket loosely enclosing said sleeve so as to provide an intermediate annular chamber, vanes or baffles constituting a spiral conduit within said chamber, a cylindrical lining disposed coaxially within the cylindrical shell so as to provide a second intermediate annular chamber, and vanes or baffles constituting a spiral conduit within said chamber, the liquid or fluid to be treated being passed in tenuous form through the shallow spiral conduit, and the heating or cooling liquid or fluid being passed through both the outer and the inner spiral conduits, contra-current to the flow of liquid or fluid being treated, in continuous heat-conducting external and internal contact with said shallow spiral conduit.

In order that this invention may be clearly understood and readily carried into practice, reference may be had to the appended explanatory sheets of drawings, upon which:—

Figure 1:
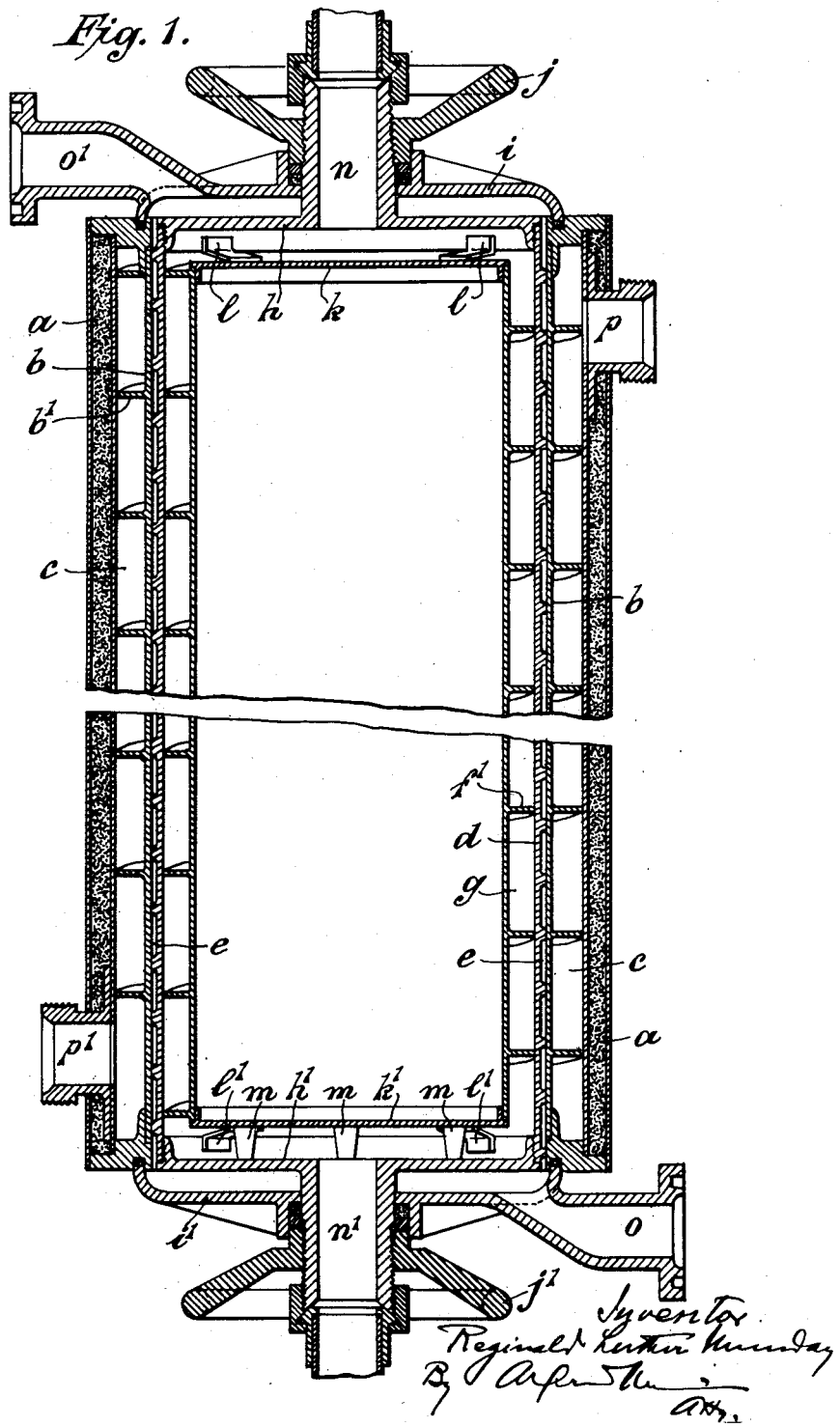
Figure 1 is a longitudinal section of a heat-exchanging apparatus in accordance with the invention.
Figure 2:
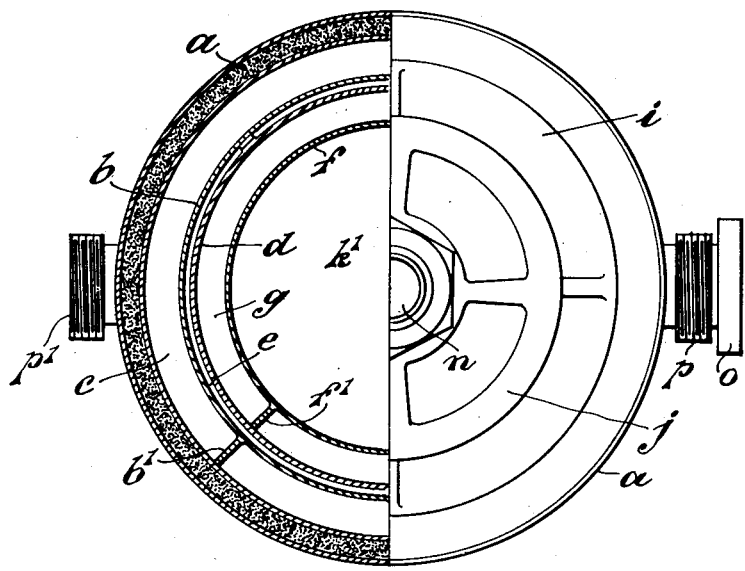
Figure 2 is a half-sectional end view of Figure 1.
Figure 3:
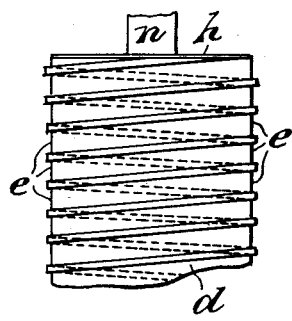
Figure 3 is a fragmentary view of the spirally grooved cylindrical shell.
Figure 4:
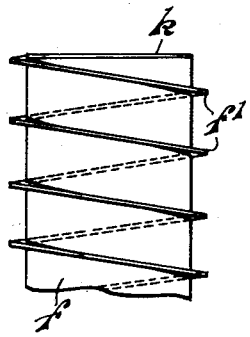
Figure 4 is a similar view of the spirally vaned cylindrical lining.

In a convenient embodiment of the invention, as designed for use in connection with the sterilization of milk or cream, a heat-insulating outer jacket $a$ of cylindrical form is provided, and within this outer jacket is fitted coaxially a cylindrical sleeve $b$ having an external spiral vane $b^1$ which constitutes a spiral conduit $c$ within the annular chamber located between the jacket $a$ and sleeve $b$. Within the sleeve $b$ is accurately fitted a coaxially cylindrical shell $d$ having a shallow external groove or grooves constituting a shallow spiral conduit $e$ between the sleeve $b$ and shell $d$, said groove or grooves being either cut in the periphery of the shell $d$, or being provided by fitting a spiral, strip or wire, or a plurality of such strips or wires, around the shell $d$. Within the shell $d$ is fitted coaxially a cylindrical lining $f$ having an external spiral vane $f^1$ which constitutes a spiral conduit $g$ within the annular chamber located between the shell $d$ and lining $f$. The intermediate shallow spiral conduit $e$ has its convolutions disposed in the opposite direction to the convolutions of the outer and inner spiral conduits $c$ and $g$, and the cylindrical members $a$, $b$ and $f$ are relatively slidable for assembly and disassembly. The spirally grooved shell $d$ is retained in position by means of internal end covers $h$ and $h^1$ and domed external end covers $i$ and $i^1$ secured by central hand straining nuts $j$ and $j^1$, and the cylindrical lining $f$ is located by means of end discs $k$ and $k^1$ provided with lugs $l$ and $l^1$ and if desired with feet or stops $m$. The internal end covers $h$ and $h^1$ are provided axially with inlet and outlet connections $n$ and $n^1$ communicating with the inner spiral conduit $g$, whilst the outer end covers $i$ and $i^1$ are provided with lateral inlet and outlet connections $o$ and $o^1$ communicating with the intermediate shallow spiral conduit $e$. The outer spiral conduit $c$ is provided with inlet and outlet connections $p$ and $p^1$ extending laterally through the outer jacket $a$.

The operation of the apparatus is as follows:—Milk is admitted through the inlet connection $o$ and is conducted in tenuous form, either by gravity, mechanical pressure, or vacuum induction, through the shallow spiral conduit $e$ for discharge by way of the outlet connection $o^1$, the milk during this tenuous flow through the spiral conduit $e$ being in close and continuous heat-conducting contact with the adjacent walls of the outer and inner spiral conduits $c$ and $g$, through which the heating or cooling water is simultaneously passed in a spiral direction contra-current to the flow of the milk under treatment. A particularly efficient and complete conduction and transfer of heat from the one liquid to the other is thereby obtained, resulting in a substantially complete exchange of temperatures between the two liquids. If desired, the grooved cylindrical shell $d$ may be adapted for rotation within the cylindrical sleeve $b$, to thereby act as a pump for inducing the tenuous flow of milk through the shallow spiral conduit $e$. The apparatus is preferably disposed vertically as illustrated, but if desired it may be used horizontally or at any convenient angle of inclination.

What I claim as my invention and desire to secure by Letters Patent is:—

1. A heat-exchanging apparatus for fluids, which comprises, in combination, a cylindrical sleeve, a cylindrical shell fitted closely and coaxially therein, grooves disposed around said shell constituting a shallow spiral conduit between the sleeve and the shell, an outer jacket loosely enclosing said sleeve so as to provide an intermediate annular chamber, spiral baffles constituting a spiral conduit within said chamber, a cylindrical lining disposed coaxially within the cylindrical shell so as to provide a second intermediate annular chamber, and spiral baffles constituting a spiral conduit within said second chamber, the fluid to be treated being passed in tenuous form through the shallow spiral conduit, and the heating or cooling fluid being passed through both the outer and the inner spiral conduits, contra-current to the flow of fluid being treated, in continuous heat-conducting external and internal contact with said shallow spiral conduit, the shallow spiral conduit being of different pitch than the other spiral conduits.

2. In a heat exchange apparatus, two concentric cylinders forming an annular fluid passageway, an additional inner and outer cylinder forming annular fluid passageways for heat exchange relation to said first annular passageway, and spiral baffles in all said passageways constraining fluids passing therethrough to follow spiral paths, the spiral path of the first passageway being of different pitch than the spiral paths of the other passageways.

In witness whereof I have hereunto set my hand.

REGINALD LUTHER MUNDAY.